(12) United States Patent
Donath et al.

(10) Patent No.: US 6,487,011 B2
(45) Date of Patent: Nov. 26, 2002

(54) TELESCOPE FOR GEODETIC INSTRUMENTS, PARTICULARLY FOR VIDEO TACHYMETERS

(75) Inventors: Bernd Donath, Jena (DE); Ludwin-Heinz Monz, Ulm (DE)

(73) Assignee: ZSP Geodsetische Systeme GmbH, Jena (DE)

( * ) Notice: Subject to any disclaimer, the term of this patent is extended or adjusted under 35 U.S.C. 154(b) by 0 days.

(21) Appl. No.: 09/844,615

(22) Filed: Apr. 27, 2001

(65) Prior Publication Data

US 2002/0005984 A1 Jan. 17, 2002

(30) Foreign Application Priority Data

Apr. 28, 2000 (DE) .......................... 100 20 986

(51) Int. Cl.[7] .......................... G02B 23/00; G01B 11/26
(52) U.S. Cl. .................. 359/399; 359/363; 359/429; 356/4.01; 356/141.1; 33/290
(58) Field of Search .................. 359/399, 431, 359/423–429, 831–837; 356/4.01, 614, 400–401, 149–153; 250/203.1, 203.2, 206.1, 561; 33/290–295

(56) References Cited

U.S. PATENT DOCUMENTS

| | | | |
|---|---|---|---|
| 4,611,911 A | * | 9/1986 | Kadomatsu |
| 5,329,347 A | * | 7/1994 | Wallace et al. |
| 5,440,112 A | * | 8/1995 | Sakimura et al. |
| 5,517,297 A | * | 5/1996 | Stenton |
| 5,923,468 A | * | 7/1999 | Tsuda et al. |
| 6,324,024 B1 | * | 11/2001 | Shirai et al. |

FOREIGN PATENT DOCUMENTS

| | | |
|---|---|---|
| DE | 42 17 000 | 11/1993 |
| DE | 295 18 708 | 2/1996 |
| DE | 198 54 489 | 5/1999 |
| EP | 0 281 518 | 2/1988 |

OTHER PUBLICATIONS

*Abstract of DE 295 18 708.
English Abstract of reference EP 281518.

* cited by examiner

Primary Examiner—Thong Nguyen
(74) Attorney, Agent, or Firm—Reed Smith LLP

(57) ABSTRACT

A telescope for geodetic instruments, comprises an objective and device for generating separate beam paths for target seeking or image detection and for distance measurement. In the beam path for target seeking, a CCD camera with CCD matrix or a position-dependent photoelectric receiver arrangement (quadrant photoreceiver) is provided in a first image plane of the objective. A receiver for distance measurement is located in a second image plane of the objective. An evaluating device is connected with the CCD camera or receiver arrangement for signal evaluation and/or image evaluation. A device for generating a third, wide-angle, beam path are provided in the telescope. A supplementary objective cooperating with the objective is advantageously provided for generating the wide-angle beam path.

8 Claims, 1 Drawing Sheet

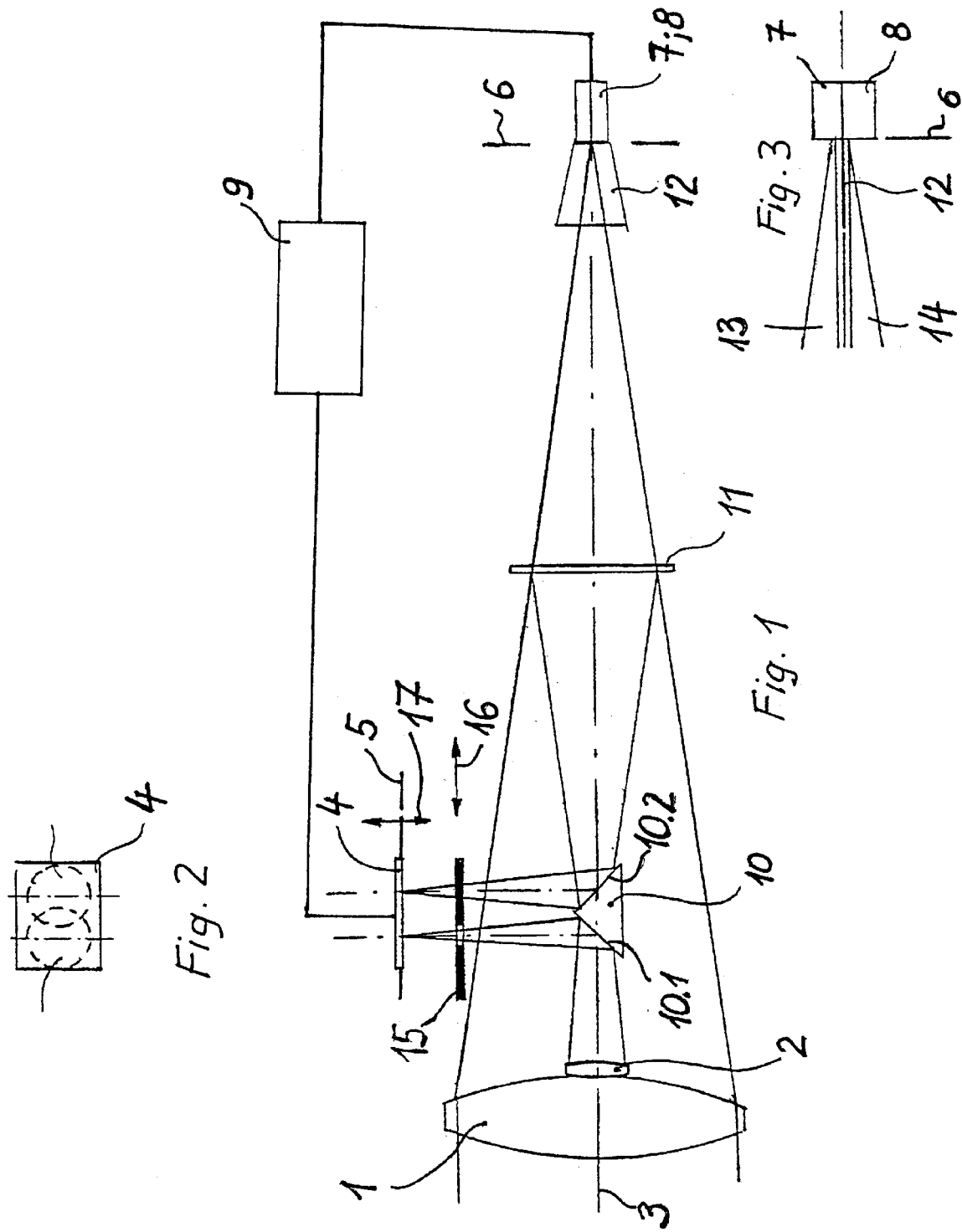

TELESCOPE FOR GEODETIC INSTRUMENTS, PARTICULARLY FOR VIDEO TACHYMETERS

BACKGROUND OF THE INVENTION a) Field of the Invention

The invention is directed to a telescope for geodetic instruments, particularly for video tachymeters or video theodolites, with beam paths used for different purposes.

b) Description of the Related Art

Conventional telescopes of geodetic instruments usually have an objective, a focusing lens which is generally constructed in such a way that a short overall length of the telescope is achieved. These telescopes further comprise a reticle plate and an eyepiece for visual observation of the object. As a rule, these telescopes have a fixed focal length and magnification which are designed in accordance with the requirements of the instrument.

Modem electro-optic tachymeters have, in addition, separate beam paths for distance measurement function and target seeking function, as they are called, these separate beam paths being coupled out of the visible telescope beam path and coupled in in the transmitter. With respect to sensitive target seeking, imaging is generally carried out on the CCD matrix or on the CCD chip of a CCD camera or on a quadrant diode with which a corresponding image evaluation and/or signal evaluation is then carried out.

In order to make possible different image fields, DE-GM 90 07 731 discloses a wide-angle camera and a telecamera placed on a tachymeter telescope, so that the tachymeter can be controlled remotely from an operator device by means of a joystick.

In an arrangement according to EP 0 281 518, the imaging of a reference mark is carried out in the form of a diaphragm outside the visible field of view on the camera to ensure correlation with the sighting axes. For this purpose, the camera is arranged on the telescope, wherein the image is reflected in the camera through a prism and supplementary optics.

A further development of this arrangement is described by Gruhn and Kahmen in a publication for the conference on "Optical 3-D Measurement Techniques, III", Vienna, 2 to Oct. 4, 1995, page 256. The CCD camera arranged on the telescope has a second beam path with supplementary wide-angle optics which are separated from the actual telescope optics.

Recording the visual image of the terrain with a CCD camera and displaying it on a screen without using an eyepiece for the sighting and measuring functions presents the following disadvantages:

Because of its necessary large focal length, the telescope of the device has a limited and narrow telescope viewing field which is unsuitable for locating a target in the terrain or makes this considerably more difficult.

In this case, registering a large image section from the terrain is possible only by means of stringing together a plurality of individual images in a time-consuming manner.

Also, an electronic zoom function of the CCD camera would not bring about a substantial improvement.

OBJECT AND SUMMARY OF THE INVENTION

Accordingly, it is the primary object of the invention to provide a telescope for a geodetic instrument which overcomes these disadvantages and substantially simplifies the construction of a tachymeter by providing a plurality of beam paths.

In accordance with the invention, a telescope for geodetic instrument, comprises an objective and means for generating separate beam paths for target seeking or image detection and for distance measurement. In the beam path for target seeking, a CCD camera with CCD matrix or a position-dependent photoelectric receiver arrangement (quadrant photoreceiver) is provided in a first image plane of the objective. A receiver for distance measurement is located in a second image plane of the objective. The telescope further comprises an evaluating device which is connected with the CCD camera or receiver arrangement for signal evaluation and/or image evaluation. Means are also provided in the telescope for generating a wide-angle beam path.

Accordingly, it is advantageous for purposes of a simple construction when a supplementary objective cooperating with the objective is provided for generating the wide-angle beam path. A suitable individual lens can also be connected with the objective as supplementary objective.

It is advantageous when means for imaging the wide-angle beam path and the beam path for target seeking are provided in a common focal plane or image plane. A CCD matrix of a CCD camera and/or a photoelectric receiver arrangement are/is located in this common image plane.

To enable simple switching between the wide-angle beam path and the beam path for target seeking, it is advantageous when a switchable diaphragm is arranged in front of this common image plane. This switchable diaphragm causes an alternating stopping down of these beam paths by displacement in a plane parallel to the common image plane.

Accordingly, it is also advantageous when an optical element which acts as a selective mirror and reflects a portion of the light passing the objective is arranged between the objective and the second image plane of the objective to generate the beam path for target seeking.

A simple construction is provided in that an element which deflects the wide-angle beam path and, after reflection at the selective mirror, the beam path for target seeking relative to the first image plane is arranged between the objective and the selective mirror.

Further, it is advantageous when the CCD matrix and/or the receiver arrangement are/is arranged so as to be adjustable in the direction of the optical axis of the wide-angle beam path or the beam path for target seeking for purposes of carrying out focusing.

The invention will be described more fully in the following with reference to an embodiment example.

BRIEF DESCRIPTION OF THE DRAWINGS

In the drawings:

FIG. 1 shows the optical construction of the telescope;

FIG. 2 shows a top view of the CCD matrix of the CCD camera; and

FIG. 3 shows a top view of the distance measuring device arranged in the second image plane.

DESCRIPTION OF THE PREFERRED EMBODIMENTS

The telescope for geodetic instruments whose optical construction is shown in FIG. 1 comprises an objective 1 and a supplementary objective 2 which cooperates with the latter and which is advantageously arranged behind the objective 1 in the immediate vicinity thereof or is connected with it as is illustrated in FIG. 1. This supplementary objective 2 can be cemented to the objective 1 in a simple manner. With their optical powers combined, objective 1 and supplementary objective 2 constitute a wide-angle objective. The optical axis of the objective 1 is designated by reference number 3. This telescope further comprises means for generating separate beam paths for distance measurement and for target seeking, wherein a CCD matrix 4 of a CCD camera or a position-dependent photoelectric receiver arrangement (quadrant photoreceiver) are provided in a first image plane 5 of the objective 1 in the beam path for target seeking.

A radiator 7, as light source, and a receiver 8 of a distance measurement device are advantageously provided in a second image plane 6 of the objective 1. Mutual influencing of the light radiation emitted by the light source 7 and the receiver radiation impinging on the receiver 8 is eliminated to a great extent by providing a sheet 12 to prevent crosstalk between the beams. This distance measuring device and the CCD matrix 4 of the CCD camera or the receiver arrangement are connected in the first image plane 5 with an evaluating unit 9 which carries out signal evaluation and/or image evaluation.

To generate a wide-angle beam path by which a large image section of the terrain is achieved in order to improve sighting of a terrain point or target point to be measured and in order to ensure that the beam path for target seeking and the wide-angle beam path are in the first image plane 5, that is, that they are focussed on the CCD matrix, optical means 10, for example, in the form of a deflecting element deflecting light from two opposite directions, and another optical element 11, e.g., a selective mirror, are arranged along the optical axis in series between the objective 1 and the second image plane 6. FIG. 1 shows means 10 as a right-angle prism whose leg surfaces 10.1 and 10.2 are the beam-deflecting surfaces.

Three beam paths used for different purposes are realized in this telescope by means of this arrangement of the optical components. These beam paths are the beam path for target seeking or image detection, the beam path for distance measurement and the wide-angle beam path.

The beam path for target seeking or image detection is realized in the following way: The light entering via the objective 1 is reflected on the optical element 11 (selective mirror), deflected at the beam-deflecting surface 10.2 of the optical element 10, and imaged on the CCD matrix 4 of the CCD camera.

In the beam path for distance measurement, the beam emitted by the light source 7 in a transmitting beam path 13 is transmitted in the form of a half-pupil through the optical element 11 and the objective 1 to the target point (not shown) to be measured which can also be a triple prism. The beam reflected at the latter is directed to the receiver 8 in the receiver beam path 14 via the objective 1 and the optical element 11. For this purpose, the receiver beam path 14 and the transmitting beam path 13 are separated by the sheet 12 to prevent crosstalk between the beams. The signals supplied by the receiver 8 are further processed in the evaluating unit 9 to form distance measurement values.

The third beam path, the wide-angle beam path, is realized in the following manner: In this beam path, a large area around the target point can be recorded and location of a target point to be measured can accordingly be facilitated, among other things. With this beam path, the target area is imaged on the CCD matrix 4 arranged in the first image plane 5 through the objective 1, the supplementary objective 2 and via the beam-deflecting surface 10.1 of the optical means 10 constructed as a right-angle prism.

In order to be able to switch in image plane 5 between the wide-angle beam path and the beam path for target seeking, a displaceable diaphragm 15 is arranged in front of this image plane 5. The displacing direction is indicated by arrow 16.

Arrow 17 represents the displacement of the CCD matrix 4 for carrying out focusing.

It has proven advantageous when a ratio of the focal lengths of the wide-angle beam path and the focal length of the beam path for target seeking is 1:3. Another ratio is also possible. In the above-mentioned ratio of 1:3, the viewing field of the wide-angle beam path is approximately three-times as great as the viewing field of the beam path for target seeking.

FIG. 2 shows a top view of the CCD matrix 4 with the fields covered by the imaged beam paths.

FIG. 3 shows a top view of the light source 7 and receiver 8 and transmission and reception beam path 13; 14 between which is arranged the sheet 12 for separation.

While the foregoing description and drawings represent the present invention, it will be obvious to those skilled in the art that various changes may be made therein without departing from the true spirit and scope of the present invention.

What is claimed is:

1. A telescope for geodetic instruments, comprises:
   an objective;
   means for generating separate beam paths for target seeking or image detection and for distance measurement;
   in the beam path for target seeking, a CCD camera with CCD matrix or a position-dependent photoelectric receiver arrangement (quadrant photoreceiver) being provided in a first image plane of the objective;
   a receiver for distance measurement being located in a second image plane of the objective; and, further comprising:
   an evaluating device being connected with the CCD camera or receiver arrangement for signal evaluation and/or image evaluation; and
   means for generating a wide-angle beam path being provided in the telescope.

2. The telescope according to claim 1, wherein a supplementary objective cooperating with the objective is provided for generating the wide-angle beam path.

3. The telescope according to claim 1, wherein optical means for imaging the wide-angle beam path and the beam path for target seeking are provided in a common image plane.

4. The telescope according to claim 1, wherein the CCD matrix of the CCD camera or the photoelectric receiver arrangement is provided in the common image plane.

5. The telescope according to claim 1, wherein a switchable diaphragm is arranged in front of this common image plane for alternately stopping down the wide-angle beam path and the beam path for target seeking.

6. The telescope according to claim 1, wherein an optical element acting as a selective mirror is arranged between the objective and the second image plane of the objective for generating the beam path for target seeking.

7. The telescope according to claim 1, wherein an element which deflects the wide-angle beam path and the beam path for target seeking relative to the first image plane is arranged between the objective and the selective mirror.

8. The telescope according to claim 1, wherein, for purposes of the focusing, the CCD matrix or the receiver arrangement is arranged so as to be adjustable in the direction of the optical axis of the wide-angle beam path or of the beam path for target seeking.

* * * * *